US008755187B2

(12) United States Patent
Zhang et al.

(10) Patent No.: US 8,755,187 B2
(45) Date of Patent: Jun. 17, 2014

(54) SYSTEMS, DEVICES, AND METHODS, INCLUDING A BASEPAN COMPRISING A BANDING STUD FOR INCREASING CURRENT CARRYING CAPACITY

(75) Inventors: Fan Zhang, Suwanee, GA (US); Robert E. Henry, Jr., Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1161 days.

(21) Appl. No.: 11/421,825

(22) Filed: Jun. 2, 2006

(65) Prior Publication Data

US 2007/0279844 A1 Dec. 6, 2007

(51) Int. Cl.
*H05K 7/20* (2006.01)
*H02B 1/00* (2006.01)
*H01R 13/46* (2006.01)
*H02B 1/20* (2006.01)

(52) U.S. Cl.
USPC ........... 361/704; 361/676; 361/637; 361/648; 361/650; 174/59

(58) Field of Classification Search
USPC ................... 361/641, 648, 676, 637; 174/59
See application file for complete search history.

(56) References Cited

U.S. PATENT DOCUMENTS

| | | | | |
|---|---|---|---|---|
| 3,164,752 A * | 1/1965 | Koenig | | 361/648 |
| 4,521,827 A | 6/1985 | Jordan et al. | | |
| 4,577,402 A | 3/1986 | Swanstrom | | |
| 4,646,200 A | 2/1987 | M'Sadoques | | |
| 4,740,865 A | 4/1988 | Barner | | |
| 4,916,574 A | 4/1990 | Hancock | | |
| 5,341,273 A * | 8/1994 | Sharp et al. | | 361/641 |
| 5,450,282 A * | 9/1995 | Webber et al. | | 361/637 |
| 5,721,667 A | 2/1998 | Rose | | |
| 5,786,982 A | 7/1998 | Rose | | |
| 5,969,937 A * | 10/1999 | Rose et al. | | 361/645 |
| 5,973,914 A * | 10/1999 | Rose et al. | | 361/627 |
| 6,160,698 A | 12/2000 | Tumlin | | |
| 6,226,184 B1 * | 5/2001 | Stolz et al. | | 361/704 |
| 6,266,232 B1 * | 7/2001 | Rose et al. | | 361/645 |
| 6,459,570 B1 | 10/2002 | Buchanan | | |
| 7,298,606 B2 * | 11/2007 | M'Sadoques et al. | | 361/644 |
| 2004/0145837 A1 | 7/2004 | Davis | | |
| 2004/0207344 A1* | 10/2004 | Derksen | | 318/16 |
| 2005/0174736 A1 | 8/2005 | Merlet | | |
| 2006/0114648 A1 | 6/2006 | Dixon et al. | | |
| 2007/0211205 A1* | 9/2007 | Shibata | | 349/161 |

FOREIGN PATENT DOCUMENTS

| | | |
|---|---|---|
| CA | 2325148 A1 | 5/2001 |
| EP | 0 325 371 | 7/1989 |
| GB | 1247928 A | 9/1971 |

OTHER PUBLICATIONS

PCT International Search Report corresponding to PCT Patent Application No. PCT/US2007/006092 filed Mar. 9, 2007 (5 pages).
PCT Written Opinion of the International Searching Authority corresponding to PCT Patent Application No. PCT/US2007/006092 filed Mar. 9, 2007 (8 pages).

* cited by examiner

*Primary Examiner* — Zachary M Pape

(57) ABSTRACT

Certain exemplary embodiments can comprise a system, which can comprise a basepan comprising a banding stud. The banding stud can be configured to releasably attach a heat sink to the basepan. The heat sink configured to increase a current carrying capacity of a system associated with the basepan from a first predetermined level to a second predetermined level.

18 Claims, 8 Drawing Sheets

SYSTEMS, DEVICES, AND METHODS, INCLUDING A BASEPAN COMPRISING A BANDING STUD FOR INCREASING CURRENT CARRYING CAPACITY

BACKGROUND

United States Patent Publication No. 20040145837 (Davis), which is incorporated by reference herein in its entirety, allegedly recites that "[t]here is provided a method and a basepan assembly for a panel board. The basepan assembly comprises a basepan having a bottom portion and at least one sidewall. A first bus bar is mounted in the bottom portion of the basepan. A second bus bar is mounted to its side proximate the side wall of the basepan. The side wall can include fasteners to couple the second bus bar to the side wall." See Abstract.

U.S. Pat. No. 6,459,570 (Buchanan), which is incorporated by reference herein in its entirety, allegedly recites that "[t]he present invention provides a support base and neutral base for an interior assembly in an electrical distribution device and a method of assembling the same. The interior assembly having at least one bus bar and neutral bar connecting the electrical distribution device to a circuit having at least one phase. The neutral bar and bus bar having a bottom wall and side walls. The support base includes a generally planar body defining a mounting surface on one face of the body and means for mounting the bus bar on the mounting surface. The support base also includes means for retaining the bottom wall of the neutral bar abutting the mounting surface of the body. The retaining means is manually operated and integrally formed with the mounting surface and has a plurality of projections upstanding from the mounting surface. The projections are adapted to abut the side walls of the neutral bar so as to prevent movement in at least one direction horizontally. The retaining means also has at least one interlocking prong for abutting one or more side walls of the neutral bar so as to prevent movement in the vertical direction and the remaining horizontal directions." See Abstract.

U.S. Pat. No. 6,160,698 (Tumlin), which is incorporated by reference herein in its entirety, allegedly recites a "first surface of a basepan of molded plastic for an electric load center includes a plurality of integrally formed fasteners for securing electrical components such as bus bars, neutral bars, and neutral tie bars to the basepan. Each fastener is formed in the absence of any core through the basepan from a second surface obverse to the first. Each integrally formed fastener has a support portion which projects away from the basepan first surface and a flexural portion supported by the support portion. The flexural portion has a first outwardly facing surface inclined with respect to the basepan first surface at an angle that facilitates elastic deformation of the flexural portion, but not the support portion upon application of a bar to the basepan. The flexural portion also has a second inwardly facing surface arranged at an angle with respect to the basepan first surface that facilitates fixed retention of the bar despite any reasonable variation in the thickness of the bar." See Abstract.

SUMMARY

Certain exemplary embodiments comprise a system, which can comprise a basepan comprising a banding stud. The banding stud can be configured to releasably attach a heat sink to the basepan. The heat sink configured to increase a current carrying capacity of a system associated with the basepan from a first predetermined level to a second predetermined level.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
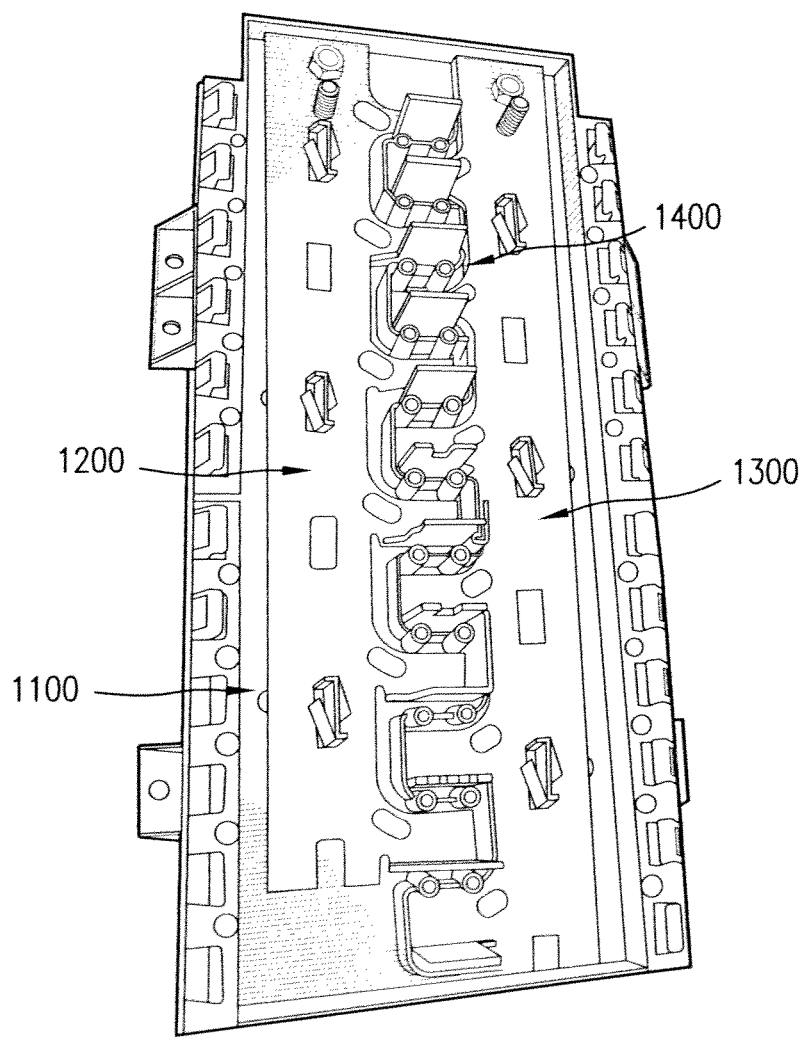
FIG. 1 is a plan view of an exemplary embodiment of a basepan 1000.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapted to—made suitable or fit for a specific use or situation.
adapter—a device used to effect operative compatibility between different parts of one or more pieces of an apparatus or system.
aluminum—a ductile metallic element having an atomic number of 13.
amp (ampere)—a unit used to define the rate of flow of electricity (current) in a circuit; units are one coulomb (6.28×1018 electrons) per second.
and/or—either in conjunction with or in alternative to.
apparatus—an appliance or device for a particular purpose.
associate—to join, connect together, and/or relate.
attach—to fasten, secure, couple, and/or join.
attachable—capable of being fastened, secured, coupled, and/or joined.
banding stud—a threaded male fastener configured to attach a heat sink and/or connection spacer to a basepan.
basepan—a panel, potentially having an irregular surface, configured to be installed in an electrical enclosure, the panel configured to have a bus bar mounted thereon.
bus bar—a common electrical power terminal to which multiple circuits are electrically coupled through either fuses or circuit breakers.
can—is capable of, in at least some embodiments.
cause—to produce an effect.

circuit breaker—a device adapted to automatically open an alternating current electrical circuit.

comprising—including but not limited to.

configure—to make suitable or fit for a specific use or situation.

configured to—made suitable or fit for a specific use or situation.

connect—to join or fasten together.

connection spacer—a component adapted to extend a bus bar in order to receive incoming current conductors.

convert—to transform, adapt, and/or change.

copper—a ductile, malleable, metallic element having an atomic number of 29.

couple—to join, connect, and/or link together.

coupleable—capable of being joined, connected, and/or linked together.

coupling—linking in some fashion.

create—to bring into being.

current carrying capacity—a maximum quantity of electrical current that can be safely conducted through a particular electrical device.

define—to establish the outline, form, or structure of.

determine—to obtain, calculate, decide, deduce, and/or ascertain.

device—a machine, manufacture, and/or collection thereof.

direction—a distance independent relationship between two points in space that specifies the position of either with respect to the other; the relationship by which the alignment or orientation of any position with respect to any other position is established.

electrical—pertaining to electricity.

estimate—to calculate and/or determine approximately and/or tentatively.

generate—to create, produce, give rise to, and/or bring into existence.

heat sink—a device that absorbs and/or dissipates heat generated by a system.

increase—to become greater or more in size, quantity, number, degree, value, intensity, and/or power, etc.

initialize—to prepare something for use and/or some future event.

install—to connect or set in position and prepare for use.

level—a relative position on a scale.

may—is allowed and/or permitted to, in at least some embodiments.

method—a process, procedure, and/or collection of related activities for accomplishing something.

motion—changing position or place.

nut—a block of metal or wood defining a central, threaded hole that is configured to fit around and secure a male threaded fastener.

panel—a housing adapted to contain electrical components, such as a circuit interrupter, meter, and/or circuit breaker, adapted to manage electrical energy to an electrical device and/or in a circuit.

plurality—the state of being plural and/or more than one.

predetermined—established in advance.

probability—a quantitative representation of a likelihood of an occurrence.

project—to calculate, estimate, or predict.

provide—to furnish, supply, give, and/or make available.

receive—to get as a signal, take, acquire, and/or obtain.

recommend—to suggest, praise, commend, and/or endorse.

releasably—capable of being freed, in a substantially nondestructive manner, from something that binds, fastens, or holds back.

repeatedly—again and again; repetitively.

restrain—to limit and/or restrict.

select—to make a choice or selection from alternatives.

serpentine shaped—characterized by an undulating contour.

set—a related plurality.

snapably—to be able to open, close, and/or fit together with a click.

space—a gap.

store—to place, hold, and/or retain data, typically in a memory.

substantially—to a great extent or degree.

substrate—an underlying layer.

support—to bear the weight of, especially from below.

system—a collection of mechanisms, devices, data, and/or instructions, the collection designed to perform one or more specific functions.

thermal—pertaining to temperature.

thermally coupled—joined in a manner such that heat transfer can take place between elements.

thermoplastic—a polymeric substance that can be softened by heat and hardened by cooling in a reversible physical process such as, for example, GE Noryl SE1-X (available from GE Plastics, of Pittsfield, Ma.) and/or Asahi Xyron 540V (available from Asahi Kasei America Inc., of N.Y., N.Y.), etc.

transmit—to send as a signal, provide, furnish, and/or supply.

via—by way of and/or utilizing.

weight—a value indicative of importance.

DETAILED DESCRIPTION

Certain exemplary embodiments comprise a system, which can comprise a basepan comprising a banding stud. The banding stud can be configured to releasably attach a heat sink to the basepan. The heat sink configured to increase a current carrying capacity of a system associated with the basepan from a first predetermined level to a second predetermined level.

FIG. 1 is a plan view of an exemplary embodiment of a basepan 1000, which can comprise a substrate 1100. Substrate 1100 can be fabricated from an electrically insulating material, such as a thermoplastic, plastic, polymer, Teflon, elastomer, porcelain, quartz, alumina, and/or silicon, etc. For example, substrate 1100 can be fabricated from a Noryl SE1-X material available from General Electric Plastics of Pittsfield, Ma. As another example, substrate 1100 can be fabricated from a Xyron 540V material available from the Asahi Kasei Corporation of Osaka, Japan. Substrate 1100 can be configured to support one or more bus bars, such as a first bus bar 1200 and/or a second bus bar 1300. A serpentine shaped barrier 1400 can separate first bus bar 1200 and second bus bar 1300.

Figure 2:
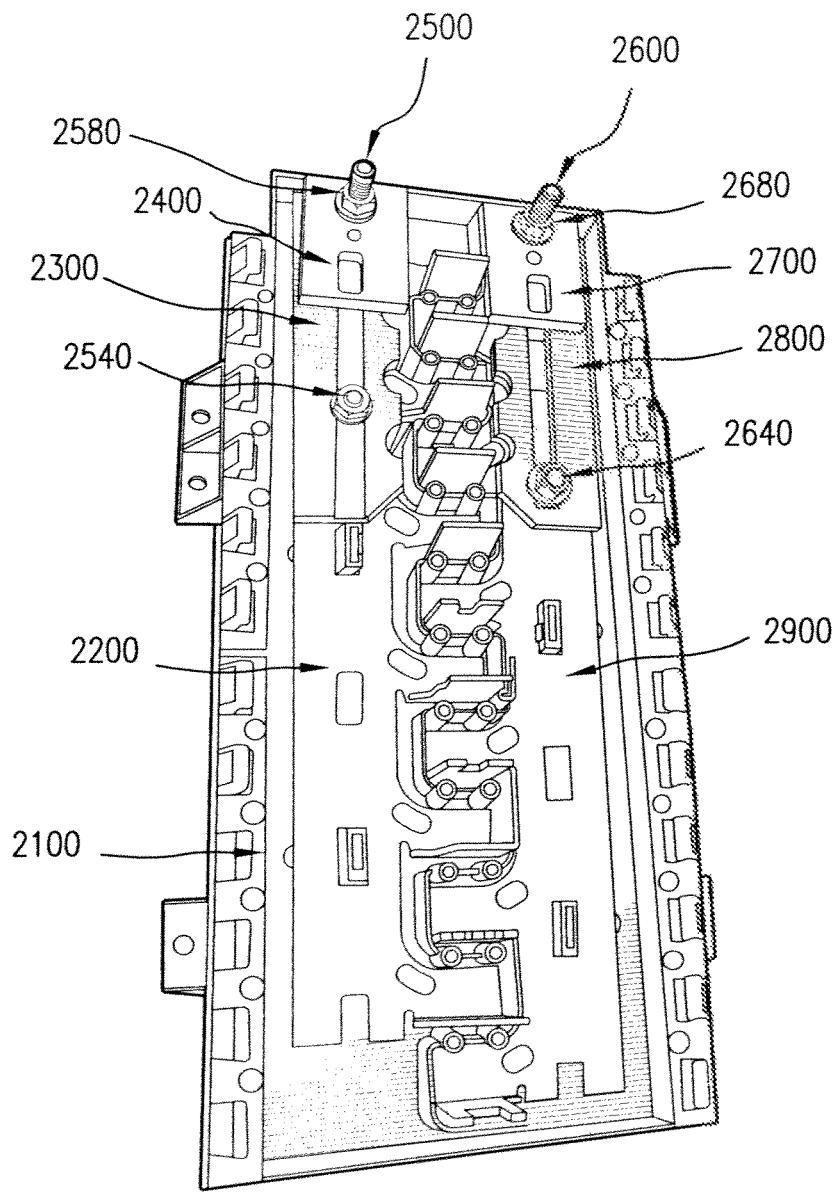
FIG. 2 is a plan view of an exemplary embodiment of a basepan 2000.

FIG. 2 is a plan view of an exemplary embodiment of a basepan 2000, which can comprise a substrate 2100. In certain exemplary embodiments, a first bus bar 2200 and/or a second bus bar 2900 can be snapably attachable to basepan 2000. In certain exemplary embodiments, first bus bar 2200 and/or second bus bar 2900 can be snapably attached to substrate 2100, which can be a thermoplastic base of basepan 2000. First bus bar 2200 can be configured to be thermally coupled to a first heat sink 2300 such that heat can conductively flow therebetween. Second bus bar 2900 can be configured to be thermally coupled to a second heat sink 2800 such that heat can conductively flow therebetween. First heat sink 2300 and/or second heat sink 2800 can be fabricated from an electrically and/or thermally conductive material. For example, first heat sink 2300 and/or second heat sink 2800 can comprise copper, aluminum, zinc, tin, steel, silver, and/or gold, etc.

Basepan 2000 can comprise one or more banding studs. For example, basepan 2000 can comprise a first banding stud 2500, second banding stud 2600, third banding stud 2540, and/or fourth banding stud 2640. Each of first banding stud 2500 and/or second banding stud 2600 can be configured to releasably attach first heat sink 2300 and/or a first connection spacer 2400 to basepan 2000. Similarly, each of third banding stud 2540, and/or fourth banding stud 2640 can be configured to releasably attach second heat sink 2800 and/or a second connection spacer 2700 to basepan 2000. Each of first banding stud 2500, second banding stud 2600, third banding stud 2540, and/or fourth banding stud 2640 can be seated and/or embedded in substrate 2100 of basepan 2000. Basepan 2000 can comprise one or more nuts associated with each banding stud. For example a first nut 2580 can be releasably attached to first banding stud 2500. Similarly, a second nut 2680 can be releasably attached to second banding stud 2600. In an installed configuration, first banding stud 2500 and first nut 2580 can be configured to restrain motion of heat sink 2300 in at least one direction, such as a direction perpendicular to a plane defined by basepan 2000. Likewise, an installed configuration, second banding stud 2600 and second nut 2680 can be configured to restrain motion of second heat sink 2800 in at least one direction.

First heat sink 2300 and/or second heat sink 2800 can be configured to increase a current carrying capacity of a system associated with basepan 2000 from a first predetermined level to a second predetermined level. For example, the first predetermined level can be approximately, in amps, 20, 40, 75, 99.1, 100, 120, 150.1, 200, 249, 300, 400, 420.2, 600, 1000, 1222.1, 1500, 2000, and/or any value or subrange therebetween. The second predetermined level can be related to and/or correspond to the first predetermined level. The second predetermined level, respectively corresponding the first predetermined level can be approximately, in amps, 40, 89, 155, 199.2, 180, 240, 250.1, 400, 449, 540, 700, 840.2, 900, 1600, 1430.1, 1300, 4000, and/or any value or subrange therebetween.

In certain exemplary embodiments, a length and width of basepan 2000 can remain the same before and after installation of first heat sink 2300 and/or second heat sink 2800. In certain exemplary embodiments, a thickness of basepan 2000 can be increased via the installation of first heat sink 2300 and/or second heat sink 2800, which can increase an ability of basepan 2000 to dissipate heat associated with electrical flows through basepan 2000. In certain exemplary embodiments, the thickness of basepan 2000 can be unchanged responsive to the installation of first heat sink 2300 and/or second heat sink 2800 in a cavity of basepan 2000. First heat sink 2300 and/or second heat sink 2800 can aid first bus bar 2200 and/or second bus bar 2900 in conducting current and dissipating heat by increasing an effective cross-section of first bus bar 2200 and/or second bus bar 2900. Increasing the effective cross-section of first bus bar 2200 and/or second bus bar 2900 can decrease a current density and/or increase a conductive surface area. In such embodiments, an overall volume of basepan 2000 can be unchanged responsive to an installation of first heat sink 2300 and/or second heat sink 2800.

For example, an exemplary basepan adapted for use in a system with a 200 Amp rating might be approximately thirteen inches long by approximately seven inches wide and approximately one inch thick. Such a basepan assembly might weigh slightly over two pounds without added heat sinks. Adding heat sinks to such a breaker might increase the weight by an amount in excess of a pound and might increase the thickness by over 0.25 inches. Such a modification of adding heat sinks and/or connection spacers might increase the current carrying capacity, nominal current rating, and/or instantaneous current rating of the basepan to approximately 400 Amps. Such a basepan might be connected to an electrical panel capable of comprising 24 usable positions and up to 42 electrical circuit breakers. In such a system, adding the heat sinks might increase the surface area for heat dissipation by approximately 50 square inches.

Figure 3:
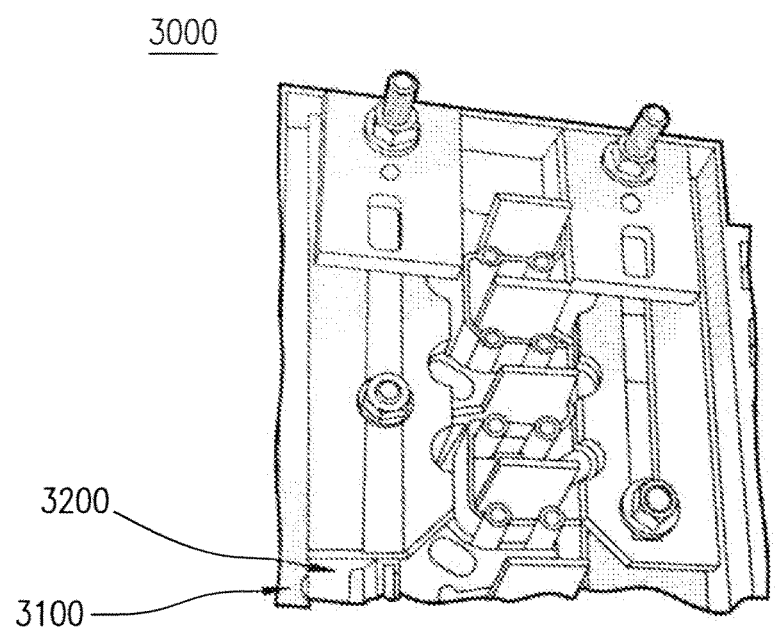
FIG. 3 is a plan view of an exemplary embodiment of a system 3000.

FIG. 3 is a plan view of an exemplary embodiment of a system 3000, which can comprise a substrate 3100 and a bus bar 3200.

Figure 4:
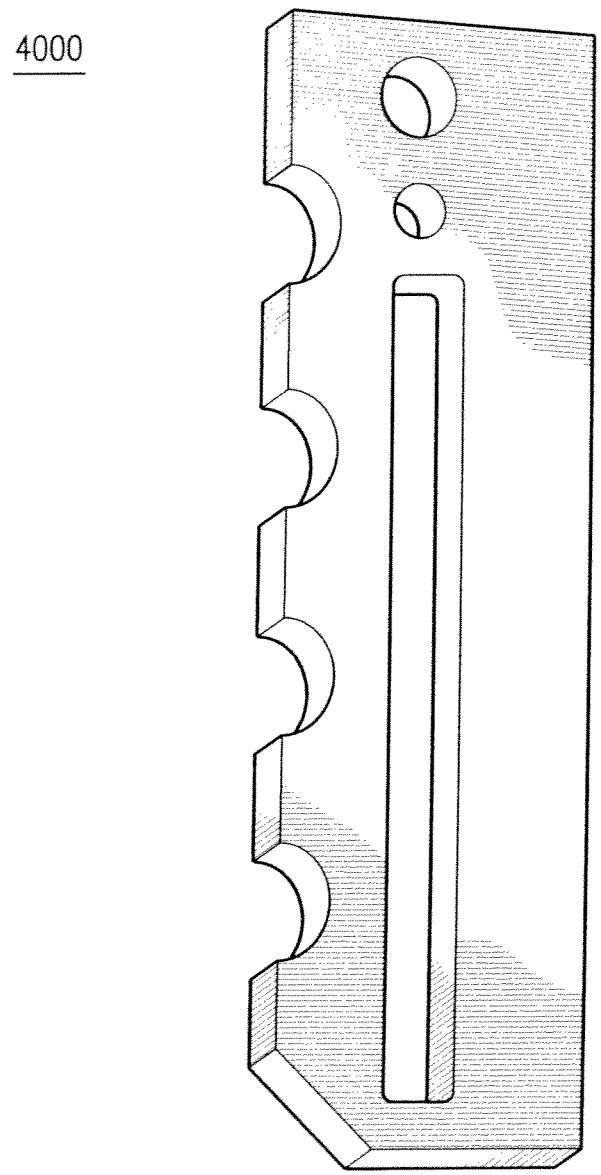
FIG. 4 is a plan view of an exemplary heat sink 4000.

FIG. 4 is a plan view of an exemplary heat sink 4000.

Figure 5:
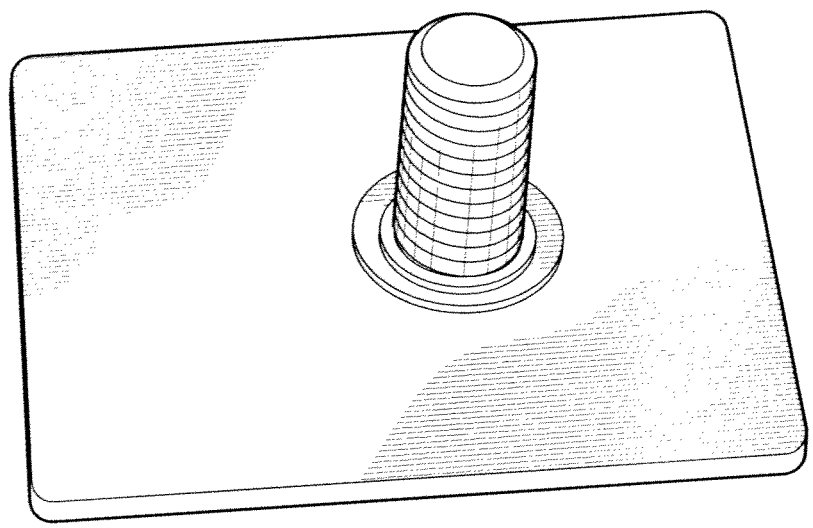
FIG. 5 is a plan view of an exemplary banding stud 5000.

FIG. 5 is a plan view of an exemplary banding stud 5000, which can be embedded in a substrate of an exemplary basepan.

Figure 6:
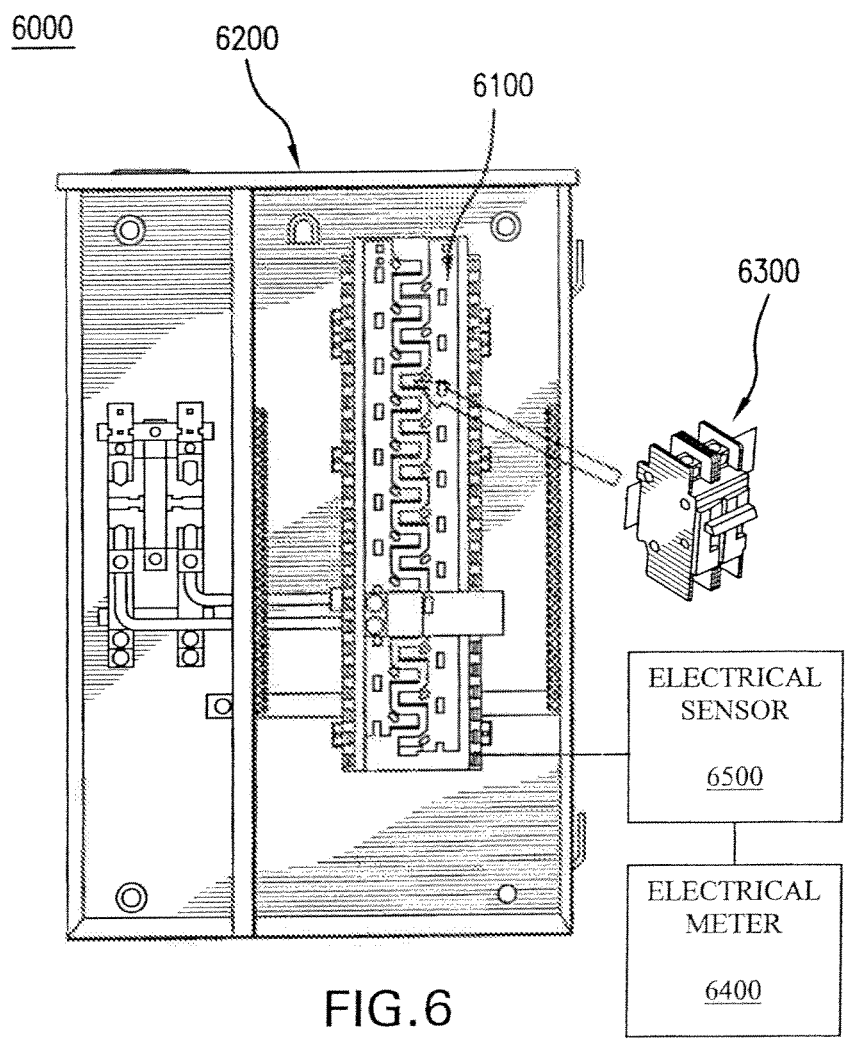
FIG. 6 is a plan view of an exemplary embodiment of a system 6000.

FIG. 6 is a plan view of an exemplary embodiment of a system 6000, which can comprise a basepan 6100. System 6000 can comprise an electrical panel enclosure 6200, which can be configured to receive basepan 6100. System 6000 can comprise one or more electrical circuit breakers, such as electrical circuit breaker 6300, which can be electrically coupled to basepan 6100. Electrical circuit breaker 6300 can be configured to be releasably attachable to basepan 6100. In certain exemplary embodiments, and electrical meter 6400, can be electrically coupled to an electrical sensor 6500 associated with basepan 6100.

Figure 7:
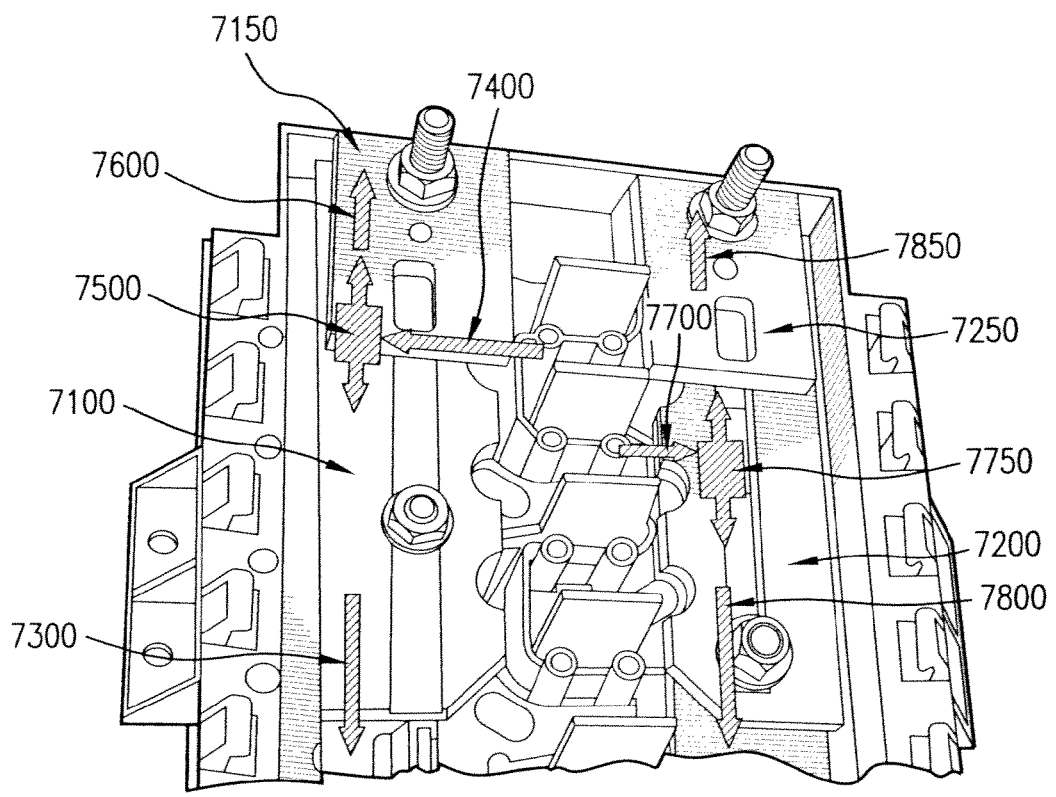
FIG. 7 is a plan view of an exemplary diagram of a heat flows in a system 7000.

FIG. 7 is a plan view of an exemplary diagram of potential heat flows in a system 7000, which can comprise a first heat sink 7100, a second heat sink 7200, a first connection spacer 7150, and/or a second connection spacer 7250.

System 7000 can be modeled as comprising a plurality of heat flows. For example, heat can be generated from electricity conducted in system 7000 via one or more bus bars. Generated heat via electrical resistances in system 7000 can conductively flow via a first heat flow 7400 away from an electrical circuit breaker (not illustrated) electrically coupled to system 7000. Heat from first heat flow 7400 can be conductively dissipated in a plurality of directions via a second heat flow 7500, which can be associated with heat sink 7100. Heat conducted via second heat flow 7500 can be conductively transferred to a third heat flow 7300 and/or a fourth heat flow 7600. Heat conducted via first heat flow 7400, second heat flow 7500, third heat flow 7300, and/or fourth heat flow 7600 can be dissipated via conductive, convective, and/or radiative heat transfer to an environment surrounding system 7000.

Similarly, generated heat from electrical resistances can conductively flow via a fifth heat flow 7700 away from the electrical circuit breaker electrically coupled to system 7000. Heat from fifth heat flow 7700 can be conductively dissipated in a plurality of directions via a sixth heat flow 7750, which can be associated with heat sink 7200. Heat conducted via sixth heat flow 7750 can be conductively transferred to a seventh heat flow 7800 and/or an eighth heat flow 7850. Heat conducted via fifth heat flow 7700, sixth heat flow 7750, seventh heat flow 7800, and/or eighth heat flow 7850 can be dissipated via conductive, convective, and/or radiative heat transfer to an environment surrounding system 7000.

Figure 8:
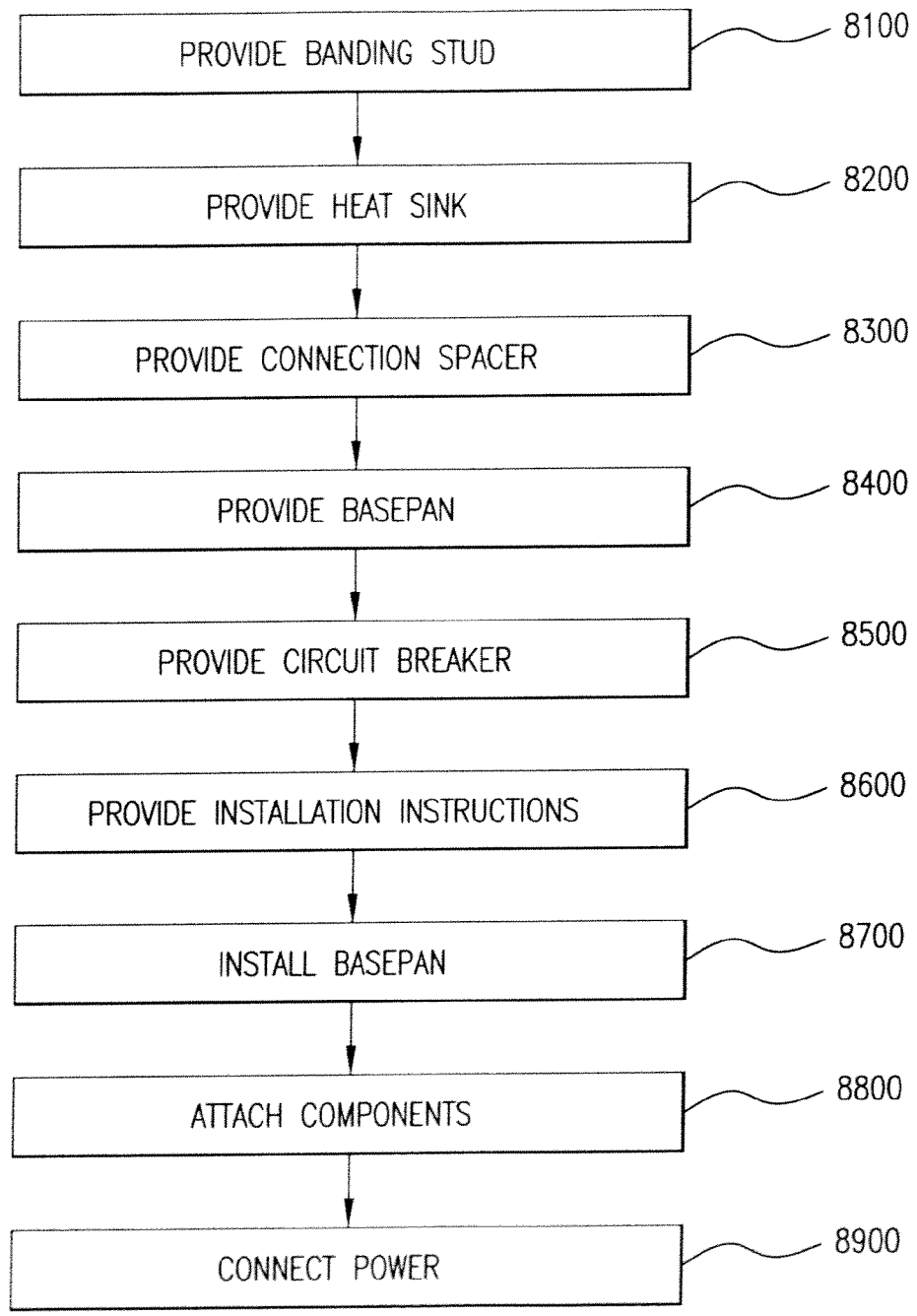
FIG. 8 is a flowchart of an exemplary embodiment of a method 8000.

FIG. 8 is a flowchart of an exemplary embodiment of a method 8000. At activity 8100, a banding stud can be provided. The banding stud can be any die cut fastener such as a machine screw, cap screw, and/or cut segment of all-thread metal, etc.

At activity 8200, a heat sink can be provided. The heat sink can be machined and/or cast according to design specifications.

At activity 8300, a connection spacer can be provided. The connection spacer can be machined and/or cast according to design specifications.

At activity 8400, a basepan can be provided. In certain exemplary embodiments, the basepan can comprise the banding stud. The banding stud can pierce and/or be embedded in a substrate of the basepan. The banding stud can be configured to releasably attach the heat sink and/or the connection spacer to the basepan. The heat sink can be added to the basepan in a manner configured to increase a current carrying capacity of a system associated with the basepan from a first predetermined level to a second predetermined level.

At activity 8500, an electrical circuit breaker can be provided, which can be electrically coupled to the basepan. The electrical circuit breaker can be electrically coupled to a connected load and can be configured to disconnect power from the electrical load responsive to a determination that an electrical current flowing to the connected load exceeds a predetermined threshold. In operative embodiments, heat can be generated by the electrical circuit breaker. The heat can be dissipated by the basepan via the heat sink.

At activity 8600, installation instructions can be provided. For example, installation instructions can inform a user of a method of assembly for the basepan, the electrical circuit breaker, the banding stud, the connection spacer, and/or the heat sink. Installation instructions can provide information regarding the increase to the current carrying capacity of the system.

At activity 8700, the basepan can be installed. The basepan can be installed in an electrical panel.

At activity 8800, components can be attached. In certain exemplary embodiments, a plurality of electrical circuit breakers can be electrically coupled to the basepan and a plurality of conductors can be electrically coupled to components in the electrical panel. In operative embodiments, power can flow via one or more buses associated with the basepan to the conductors and to electrical loads electrically coupled thereto.

At activity 8900, power can be connected to the basepan to supply electrical energy to the electrical loads.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as ilustrative in nature, and not as restrictive.

What is claimed is:

1. A system comprising:
a heat sink;
a connection spacer; and
a basepan comprising a banding stud, said banding stud releasably attaching said heat sink and said connection spacer to said basepan, said heat sink configured to increase a current carrying capacity of a system associated with said basepan from a first predetermined level to a second predetermined level.

2. The system of claim 1, further comprising:
a bus bar snapably attachable to said basepan, said bus bar configured to be thermally coupled to said heat sink.

3. The system of claim 1, further comprising:
one or more electrical circuit breakers configured to be releasably attachable to said basepan.

4. The system of claim 1, further comprising:
an electrical panel enclosure configured to receive said basepan.

5. The system of claim 1, further comprising:
an electrical panel enclosure configured to receive said basepan; and
an electrical meter electrically coupled to an electrical sensor associated with said basepan.

6. The system of claim 1, further comprising:
a nut configured to be releasably attached to said banding stud, said banding stud and said nut configured, in an installed configuration, to restrain motion of said heat sink in at least one direction.

7. The system of claim 1, wherein said first predetermined level is approximately 200 amps.

8. The system of claim 1, wherein said second predetermined level is approximately 400 amps.

9. The system of claim 1, wherein said heat sink comprises copper.

10. The system of claim 1, wherein said heat sink comprises aluminum.

11. The system of claim 1, wherein said basepan comprises a plurality of banding studs configured to releasably attach said heat sink to said basepan.

12. The system of claim 1, wherein said basepan comprises a thermoplastic substrate configured to support one or more bus bars.

13. The system of claim 1, wherein said basepan comprises a thermoplastic substrate configured to support a first bus bar and a second bus bar, said first bus bar and said second bus bar separated by a serpentine shaped space.

14. A method comprising:
   providing a heat sink, a connection spacer, and a basepan comprising a banding stud, said banding stud releasably attaching said heat sink and said connection spacer to said basepan, said heat sink configured to increase a current carrying capacity of a system associated with said basepan from a first predetermined level to a second predetermined level.

15. A device comprising:
   a heat sink;
   a connection spacer; and
   a basepan comprising a banding stud, said banding stud releasably attaching said heat sink and said connection spacer to said basepan, said heat sink configured to increase a current carrying capacity of a system associated with said basepan from a first predetermined level to a second predetermined level.

16. The device of claim 15, wherein said basepan comprises a thermoplastic material.

17. The device of claim 15, wherein said banding stud is seated on a thermoplastic base of said basepan.

18. The device of claim 15, further comprising:
   a bus bar snapably attached to a thermoplastic base of said basepan.

* * * * *